Oct. 10, 1967 G. W. McKENNA ET AL 3,346,812

HOUSING ASSEMBLAGE FOR PORTABLE TWO-WAY RADIO

Filed Dec. 1, 1964

2 Sheets-Sheet 1

HOUSING ASSEMBLAGE FOR PORTABLE TWO-WAY RADIO

Filed Dec. 1, 1964 2 Sheets-Sheet 2

INVENTORS
George W. McKenna and
Cornelius T. deKam.
BY
W. L. Stout.
THEIR ATTORNEY United States Patent Office 3,346,812
Patented Oct. 10, 1967

3,346,812
HOUSING ASSEMBLAGE FOR PORTABLE TWO-WAY RADIO

George W. McKenna, Penn Hills Township, Allegheny County, and Cornelius T. de Kam, Edgewood, Pa., assignors to Westinghouse Air Brake Company, Swissvale, Pa., a corporation of Pennsylvania Filed Dec. 1, 1964, Ser. No. 415,035
9 Claims. (Cl. 325—16)

Our invention relates generally to radio communication equipment, and more particularly to improvements in the construction and assemblage of portable transmitter-receiver apparatus.

With the advent of transistors and miniaturization of their associated components, increasing demands have caused a need for improving the physical mounting structure of communication equipment, particularly those of the portable type. The qualities of light-in-weight and smallness-in-size of the components have greatly augmented the market for miniaturized communication apparatus which is much easier to handle as well as to store. While numerous attempts in developing miniaturized radio assemblages have been proposed in the past, each of these previous developments lacked certain attributes which are paramount in achieving a proficient unit. Further, while recent improvements in semi-conductive elements have to some extent relieved several deterrences, such as: low sensitivity and selectivity, poor frequency response, gain and power handling capacity common to transistorized communication equipment, the quest for developing a portable transmitter, receiver apparatus with the above-mentioned improvements along with other advances, such as: ease of handling, maintaining and repairing; economical simplicity of construction with ruggedness, strength, durability and reliability, adequate electrical shielding between the discrete electronic stages as well as between the transmitter and receiver units; sufficient heat dissipating qualities, minimized vibrational shock to electrical and electronic components, along with the attributes of light-weight and compactness, still remained.

Accordingly, it is an object of our invention to provide a new and improved portable two-way radio having all of the above-mentioned qualities.

Another object of our invention is to provide an improved assemblage comprising an integral balanced frame structure for supporting the electronic sub-assemblies, components and necessary hardware of a portable two-way radio.

A further object of our invention is the provision of a portable two-way communication apparatus employing a unique aluminum I-beam frame, which permits back-to-back mounting of the transmitter and receiver units for providing RF isolation between the transmitter and receiver units, provides maximum protection against vibrational shock to the electrical and electronic components, furnishes maximum heat dissipating characteristics for various power stages of the transmitter and receiver units, and supplies sufficient space for easy servicing of the apparatus and replacement of components.

A still further object of our invention is to provide an improved two-way radio assembly construction which affords convenient mountings for the control hardware, antenna and microphone-speaker connectors, and provides sufficient space for mounting various battery holder clips and printed circuit board.

Other features, objects, and advantages of our invention will appear as the specification progresses.

In accordance with out invention, the new and improved communication assemblage employs a symmetrical disposed unitized aluminum I-beam structure which provides the main support for the remaining necessary radio equipment. A generally modularly constructed receiver unit is adapted to be mounted on the one side of the web portion of the I-beam frame while a printed circuit transmitter unit is adapted to be mounted to the other side of the web portion of the I-beam frame which not only promotes RF isolation but also provides that various electronic power stages of both the receiver and transmitter may be heat linked to the web portion thereby resulting in rapid dissipation of the generated heat over the large surface area of the frame. Further, the web portion is arranged with outstanding lugs or flanges for accommodating a crystal case switching relay and battery connector plug thereby eliminating of separate supports for these elements. The lower flange of the I-beam provides a suitable and sturdy support for the battery holder clip or printed circuit board of the two-way radio power supply. The I-beam is symmetrically disposed relative to an exterior housing consisting of an upper cover member and a lower shell member so that extraneous vibrations are not imparted to the electrical equipment. The upper flange of the I-beam and upper cover member support and accommodate the microphone-speaker connector, antenna connector, and the control hardware. Clearly, our unique assemblage not only results in a mechanically stable platform and chassis but also brings about an electrically reliable portable transmitter-receiver communication apparatus heretofore unknown.

For a more complete understanding of our invention as well as other realizing objects and advantages thereof, reference is made to the following detailed description taken in connection with the accompanying drawings wherein.

Figure 2:
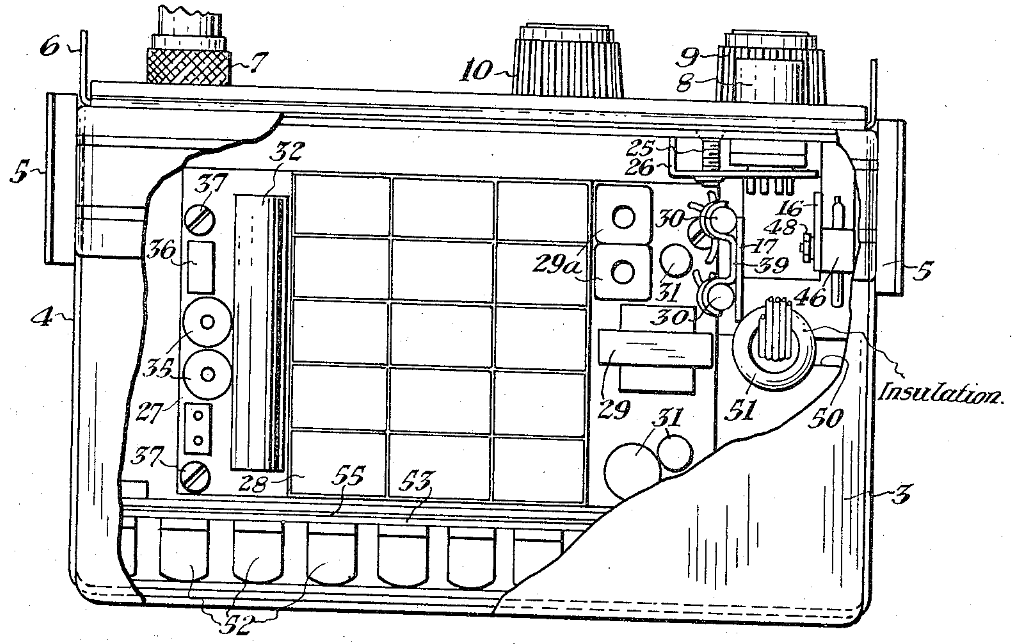
FIG. 2 is a side elevational view of the portable radio with portions broken away to show more details of the receiver unit.
Figure 1:
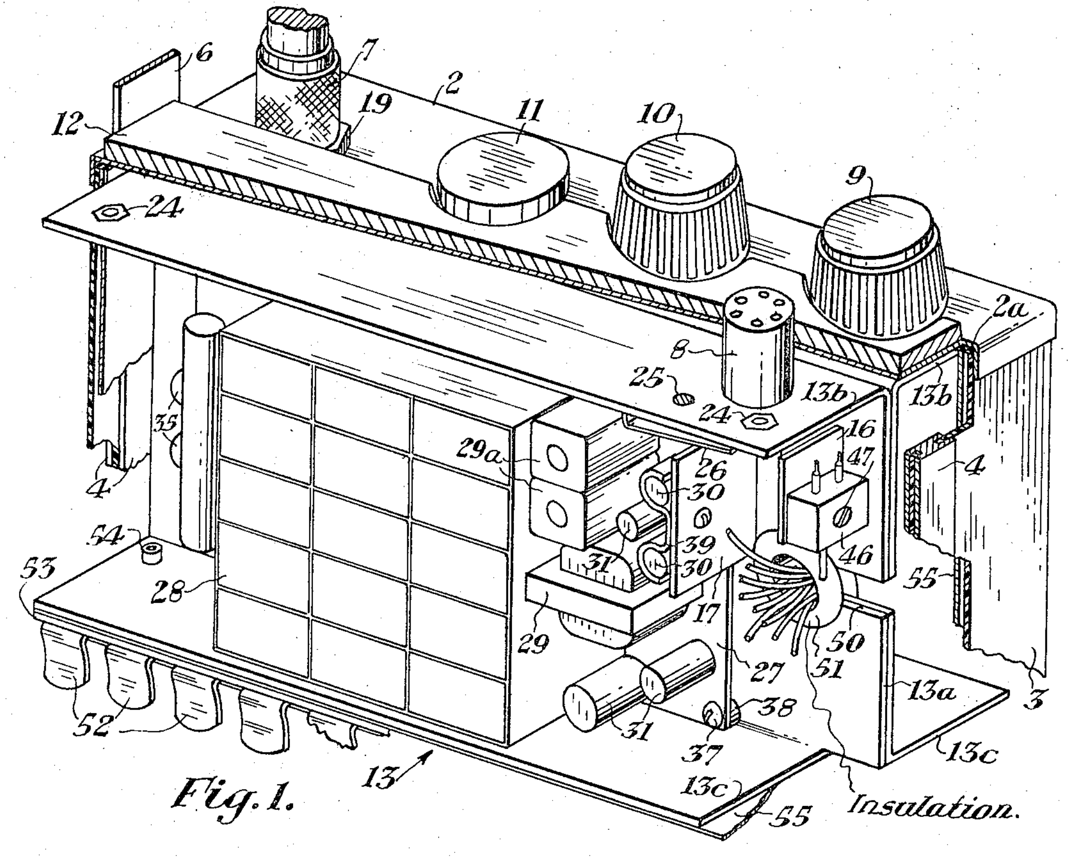
FIG. 1 is a perspective view of the radio assemblage in accordance with the present invention with portions broken away and removed to facilitate the description thereof.

Referring now to the drawings, and in particular to FIGS. 1 and 2 the portable two-way radio assembly is shown encased in a rectangularly shaped housing consisting of an upper metallic cover member 2 and a lower plastic shell member 3. A sponge rubber gasket 2*a* carried by cover member 2 cooperates with the upper lip of lower shell member 3 to provide a dust and water tight seal and further prevents direct contact between the upper and lower housing members the purpose of which will be described hereinafter. The lower shell member 3 includes a centrally located metallic reinforcing band 4 which directly contacts the cover member 2 when a pair of spring-loaded clasps 5 pivotally affixed to band 4 draw the upper and lower housing members together. An inverted U-shaped strip, partially shown at 6, provided with convenient hand grip means (not shown) serves as a suitable carrying handle for the portable radio. A conventional antenna (partially shown) and connector 7 are shown mounted on the upper cover member 2. Similarly, a connector 8 for the microphone-speaker (not shown) is mounted on the upper cover member 2. The control hardware consisting of an on-off squelch control 9, volume control 10 and a channel selector control 11, conveniently shown as a fill-in or dummy plug in the drawings, is mounted on the upper cover member 2. A decorative face plate 12 is disposed on the top surface of upper cover member 2.

A sub-assembly generally illustrated by character 13 is shown disposed within the rectangular radio housing. The sub-assembly consists basically of a substantially symmetrical aluminum I-beam frame. The I-beam may be constructed of a pair of U-shaped channel members disposed in back-to-back relation and may be fastened in any convenient manner, such as, by spot welding, or by swedging suitable bushings 38 in matching holes drilled in the web portion of the U-shaped channels or by any other suitable securing means. The I-beam frame is further provided with struck out tabs or flanges 16 and 17 on one side of web portion 13*a* and struck out tab or flange 18 on the other side of web portion 13*a* which will be described in detail hereinafter. Similarly, suitable apertures are provided throughout the I-beam structure for accommodating various elements and components which will be described later.

As is readily apparent from the drawings, the one side of the upper flange 13*b* of the I-beam frame is secured to the underside of cover member 2 by the various mounting nuts (FIG. 3) 19, 20, 21 and 22, of the antenna connector 7, volume control 9, squelch on-off control 10, and channel selector plug 11, respectively. The other side of the upper flange 13*b* is also connected to the cover member 2 and face plating 12 by means of screws 23 (FIG. 4) which threadedly engage swedged bushings 24 (FIG. 1) suitably provided in the upper flange 13*b*. Similarly, the screw 25 of the microphone-speaker connector clamp 26 aids in retaining the one side of the upper flange 13*b* to the cover member 2. Accordingly, the I-beam frame is effectively suspended from the cover member 2 with the web portion 13*a* forming a vertical plane which coincides with the central vertical plane of the radio housing.

Figure 4:
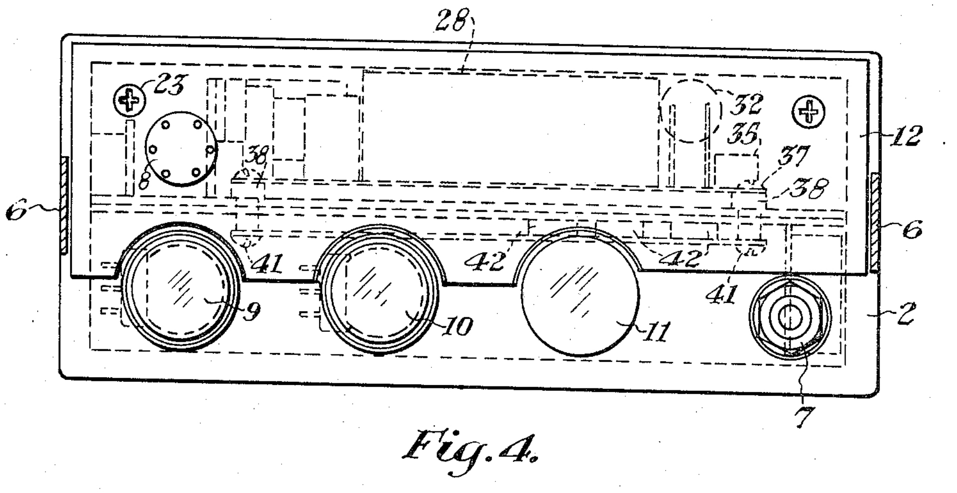
FIG. 4 is a top plan view of the two-way radio of the present invention.

FIGS. 1 and 2 show in detail the arrangement of the receiver unit in relation with the I-beam frame. The receiver unit consists of a printed circuit board 27 having mounted thereon modularly constructed front end stages 28, output transformer 29, IF transformers 29*a*, transistor output amplifiers 30, capacitors 31, mechanical vibrator 32, trimmer capacitors 35, and oscillator crystal 36. The receiver unit is securely mounted to one side of the web portion 13*a* of the I-beam frame by means of screws 37 and threaded bushings 38 (FIGS. 1 and 4). The modularly constructed section 28 which forms the front end of the receiver is constructed of conductive material so that each rectangular or cellular compartment forms its own electrical shield and provides a convenient ground for the transistor stages contained therein. The output transistors 30 which form the push-pull output amplifier stage of the receiver unit are conveniently mounted to the previously mentioned flange 17 by means of a screw secured yoke member 39. Flange 17 and yoke 39 form a thermal heat sink whereby heat generated by transistors 30 is quickly and efficiently conducted and dissipated over the large surface area provided by the I-beam structure.

The radio transmitter unit (FIG. 3) which is conveniently illustrated as merely a printed circuit board 40 may be of a modular or conventional printed circuit construction having the necessary elements and components mounted on the front surface. Like the receiver printed circuit board 27, the transmitter printed circuit board 40 is secured but to the opposite side of the web portion 13*a* by screws 40 which threadedly engage swedge bushings 38 (see FIG. 4). Conveniently disposed in alignment with transistor power amplifiers are three cylindrical metallic heat sinks 42 (shown in dotted lines, FIGS. 1 and 4) which are swedge fitted to the web portion 13*a*. The swedge fitting of the heat sinks 42 porvides good conductive contact to the web portion 13*a* of the I-beam structure so that the entire surface area of the I-beam functions to dissipate the heat which is generated in the transmitter power amplifiers. Improved thermal contact between the body of the power transistors and heat sinks 42 may be achieved by placing a commercially available silicon compound or grease within the cylindrical cup-shaped heat sinks 42.

As is readily apparent no special or additional shielding need be employed between the transmitter and receiver units for isolation purposes since the conductive web portion of the I-beam structure adequately isolates each unit from the other.

Figure 3:
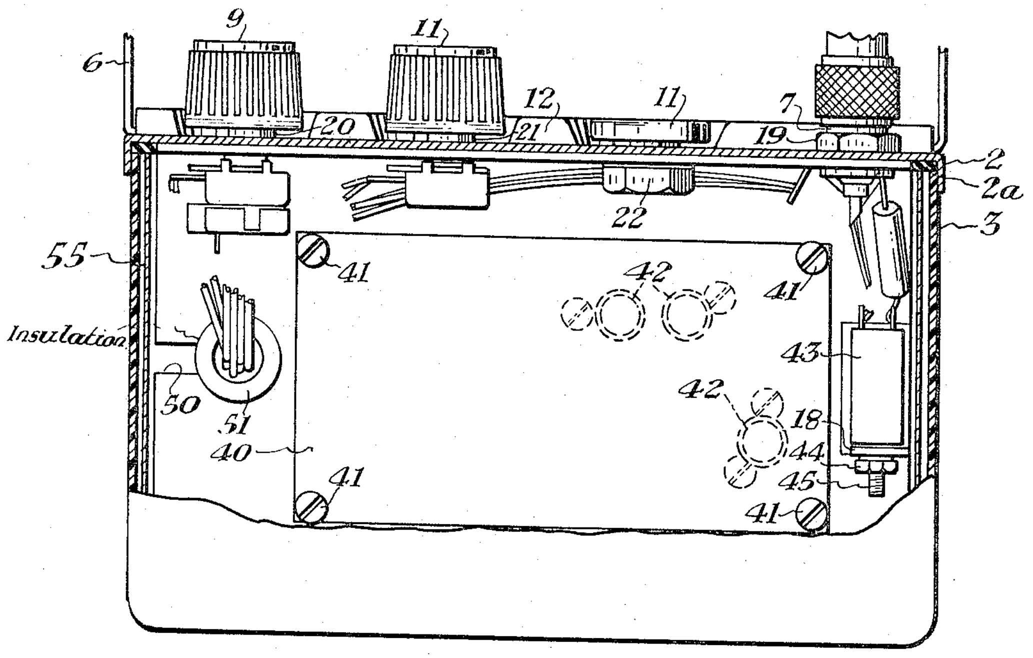
FIG. 3 is a sectionalized elevational view of the transmitter side of the radio assemblage with parts removed to facilitate the illustration.

Viewing FIG. 3, it is noted that the previously mentioned flange 18 is conveniently used as a support for the crystal case relay 43. The relay 43 is securely fastened to flange 18 by means of nut 44 and bolt 45. Similarly, the previously mentioned flange 16 (FIGS. 1 and 2) provides a convenient support for the one-pin one-socket battery plug 46. The battery plug 46 may be secured to the flange 16 by any suitable means such as screw 47 and nut 48. The web portion is provided with an elongated slot 50 for receiving rubber grommet 51 which accommodates the electrical wiring interconnecting the transmitter, receiver and various other electrical elements.

The lower flange of the I-beam structure is employed to carry the battery clips 52 and circuit board 53 (FIGS. 1 and 2) which form the battery board assembly. The battery board assembly is securely fastened to the lower flange 13*c* by means of screws (not shown) which threadedly engage swedge bushings 54 (only one of which is shown) fitted within suitable apertures in the lower flange 13. The clips 52 are arranged to receive "AA" type batteries which are serially interconnected by printed circuit board 53 for providing a 15-volt power supply for the radio unit. The battery power supply is interconnected to the battery plug 46 by a matching female-male plug leading from the battery circuit board.

A rectangular metallic shell 55 is arranged to completely surround the transmitter-receiver units which not only provides electrical shielding from external disturbances but also deters curious unauthorized access during certain times, for example, battery changeover periods. The bottom of shell 55 is disposed intermediate the lower flange 13*c* of the I-beam structure and the printed circuit board 53, and is retained in this position by the same screws which hold the battery board assembly so that the batteries are readily accessible for replacement purposes.

With the assemblage constructed in the manner herein described, it is clear that the portable two-way radio and all its elements is effectively supported by the I-beam structure 13 which not only results in a more compact unit but also in a less costly unit since the manufacturing and assembling of individual frame parts is eliminated.

Further, the symmetrical construction and disposition of the I-beam structure inhibits any traumatic effect to the internal elements, particularly the electrical and electronic components, resulting from abusive or accidental dropping or jarring of the portable two-way radio. For example, any jolt occurring to the exterior of lower housing member 3 causes vibrational waves, to be only transmitted up through the centrally located reinforcing band 4 to the upper cover member 2 since the sponge rubber gasket 2*a* absorbs any vibrations transmitted to the lip of the lower plastic member 3. The centrally located reinforcing band 4 insures that the vibrations appear at the central longitudinal axis of the cover member 2 so that an equal splitting of the vibrations occurs transversely of the longitudinal axis of the cover member 2. Upon reaching the outer extremities of cover member 2, the vibrations are reverberated toward the central axis, and, in turn, back down the band 4 back to the lower housing member 3. Any vibration reaching the I-beam structure is similarly returned to the lower housing member 3. For example, any primary or reverberated vibrations applied to cover member 2 are transmitted down through the web portion are equally distributed by the balanced lower flange 13$b$ of the I-beam, and upon reaching the outer extremities of the flange the vibrations are reverberated back to the web portion 13$a$, and back up through the web portion 13$a$ to the cover plate 2, down through band 4 and back to the lower housing member 3. Accordingly, the vibrational energy is dissipated in the lower housing member 3, the upper cover member 2 and the I-beam structure so that the transmitter-receiver components receive little, if any, deleterious vibrational effects.

As is readily apparent, the unique frame construction of the present invention eliminates the need for providing separate shielding between the transmitter and receiver units, avoids injurious effects of vibrations to the electrical components without employing special and distinct shock absorbing means, utilizes the large surface area of the I-beam frame for dissipating excessive heat generated in the power stages of the radio, and yet functions as the basic support for all the necessary radio equipment.

Further, it is readily noted that the upper and lower flanges of the I-beam construction provide convenient supports for the radio when servicing of the transmitter and/or receiver is required. Since the components of the radio are within the boundaries of the outer extremities of the flanges, that is, recessed within the I-beam, the possibility of physical damage to these elements during servicing is substantially eliminated.

Although we have shown and described but one form of assembly in relation to a portable communication unit embodying our invention, it is understood that changes and modifications may be made therein within the scope of the appended claims without departing from the spirit and scope of our invention.

Having thus described our invention, what we claim is:

1. In a portable two-way radio, the combination of a pair of housing members, a symmetrical supporting structure fixedly secured to one of said housing members, a transmitter and receiver unit fixedly mounted on and in thermal contact with said supporting structure, a battery assembly fixedly mounted on said supporting structure, and control means carried by said one housing member, said supporting structure operating as an electrical shield between said transmitter and receiver units, and said supporting structure and said housing members absorbing any vibrational shock imparted to said radio.

2. In a portable communication unit, the combination of a pair of detachable housing members, a balanced supporting frame suspended from one of said housing members, electronic transmitter and receiver sections fixedly mounted to and having various electronic stages in thermal contact with said supporting frame, a battery assembly fixedly mounted to said supporting frame, and control apparatus carried by said one housing member, said supporting frame operating as a high frequency shield between said transmitter and receiver sections, and said supporting frame and said housing members dissipating any vibrational energy imparted to said unit.

3. In a radio communication unit, the combination of two separable housing members, a symmetrical metallic supporting structure secured to and enclosed within said housing members, a transmitter and a receiver unit fixedly mounted to and in thermal contact with said supporting structure whereby excessive heat generated by said transmitter and receiver units is dissipated over the large surface area of said metallic supporting structure, a battery assembly fixedly mounted on said supporting structure, and control equipment exteriorly mounted to one of said housing members, said supporting structure operating as an RF shield between said transmitter and receiver units, and said supporting structure and said housing members absorbing any vibrational energy imparted to said radio unit.

4. In a portable two-way radio, the combination of an upper and a lower housing member, a balanced supporting frame securely fastened to said upper member, transmitter and receiver units fixedly secured to said balanced frame, battery assembly means securely fastened to said balanced frame, and control means securely fastened to said balanced frame and said upper housing member, said balanced frame preventing RF interference between and dissipating excessive heat generated by said transmitter and receiver units, and said housing members and said balanced frame functioning to absorb vibrational energy imparted to said radio.

5. In a portable communication unit, the combination of detachable upper and lower housing members, a balanced metallic frame securely fastened within said housing members, transmitter and receiver units fixedly secured to said balanced frame with various power stages of said transmitter and receiver units heat sinked to said balanced frame whereby excessive heat generated by said power stages is dissipated over the large surface area of said metallic frame, battery assembly means securely fastened to said balanced frame, and control equipment securely fastened to said balanced frame and said upper housing member, said balanced frame precluding high frequency interference between the transmitter and receiver units, and said housing members and said balanced frame functioning to dissipate any vibrational energy imparted to said communication unit.

6. In a radio communication unit, the combination of separable upper and lower housing members, a balanced supporting structure having an upper portion securely fastened to said upper member, a transmitter and a receiver section fixedly secured to an intermediate of said balanced frame, a battery assembly securely fastened to a lower portion of said balanced frame, and control means securely fastening said balanced frame to said upper housing member, said intermediate portion of said balanced frame preventing RF interference between and dissipating excessive heat generated within said sections, and said housing members and said balanced frame functioning to dissipate any vibrational energy imparted to said radio unit.

7. In a portable communication apparatus, the combination of an upper and a lower housing member, a metallic I-beam frame symmetrically disposed within said housing members, a transmitter section fixedly secured to one side of the web portion of said I-beam frame, a receiver section fixedly secured to the other side of the web portion of said I-beam frame, a battery assembly fixedly secured to the bottom flange of said I-beam frame, and control apparatus fixedly securing the upper flange of said I-beam frame to said upper housing member, said I-beam frame and said upper and lower housing members precluding vibrational energy from being imparted to said transmitter and receiver sections, and said metallic I-beam frame acting as an RF shield and a heat sink for various stages of said transmitter and receiver sections.

8. In a portable communication apparatus, the combination of an upper and a lower housing member, an aluminum I-beam frame having the top flange fixedly secured to said upper housing member, a transmitter section securely fastened to one side of the web portion of said I-beam frame, a receiver section securely fastened to the other side of the web portion of the I-beam frame thereby providing electrical shielding between said transmitter and receiver sections, a battery assembly fixedly secured to the bottom flange of said I-beam frame, and control means suitably secured to the upper flange of said I-beam frame and said upper housing member, said I-beam frame and said upper and lower housing members preventing vibrational energy from being imparted to said transmitter and receiver sections, and said aluminum I-beam frame operating as a heat sink for various power stages of said transmitter and receiver sections.

9. In a portable two-way radio, the combination of upper and lower shell members forming a rectangular housing, an aluminum I-beam frame suspended within said rectangular housing with the web portion of said I-beam frame coinciding with the central longitudinal plane of said rectangular housing, a transmitter section fixedly secured to one side of the web portion of said I-beam frame, a receiver section fixedly secured to the other side of the web portion of the I-beam frame, a battery assembly fixedly secured to the bottom flange of said I-beam frame, and control apparatus attached to the upper flange of said I-beam frame, said I-beam frame and said upper and lower shell members precluding vibrational energy from being imparted to said transmitter-receiver sections, said web portion of said aluminum I-beam frame acting as a high frequency shield, and said I-beam frame operating as a heat sink for various power stages of said transmitter and receiver sections.

References Cited

UNITED STATES PATENTS

| | | | |
|---|---|---|---|
| 2,398,406 | 4/1941 | Brauen | 325—361 X |
| 2,579,249 | 12/1951 | Bollinger et al. | 325—15 |
| 3,091,736 | 5/1963 | Germain | 325—355 |
| 3,196,349 | 7/1965 | Fryklund | 325—119 X |

JOHN W. CALDWELL, *Acting Primary Examiner.*